Nov. 18, 1952 — M. J. ISAAC — 2,618,093
LURE
Filed Aug. 22, 1946 — 2 SHEETS—SHEET 1

Matthew J. Isaac
INVENTOR.

BY
ATTORNEY

Nov. 18, 1952  M. J. ISAAC  2,618,093
LURE
Filed Aug. 22, 1946  2 SHEETS—SHEET 2

Matthew J. Isaac
INVENTOR.

BY
ATTORNEY

Patented Nov. 18, 1952

2,618,093

UNITED STATES PATENT OFFICE 2,618,093

LURE

Matthew J. Isaac, Dallas, Tex.

Application August 22, 1946, Serial No. 692,173

5 Claims. (Cl. 43—42.22)

This invention relates to new and useful improvements in lures, particularly plug-type casting lures.

One object of the invention is to provide an improved lure which is adapted to be used for deep or shallow casting.

An important object of the invention is to provide a lure having means for causing the lure to travel at different depths as the line is pulled through the water by the fishing line, whereby the same lure may be used for either deep or shallow fishing.

A further object of the invention is to provide a lure of the character described having an improved head with an inclined concave face having an integral lip projecting below and to the sides of the body of the lure for amplifying the erratic motion with which the lure travels through the water.

A particular object of the invention is to provide a plug-type lure, of the character described, having an inclined concave face which normally causes the lure to dive, in combination with a control plate pivotally connected with the head and adjustable to control the depth at which the lure travels.

Another object of the invention is to provide a lure of the character described, wherein the control plate may be utilized as an additional depending lip to increase the diving action of the lure and to further amplify the erratic motion of the lure.

A still further object of the invention is to provide a plug-type lure which may be adjusted to be used as a floating lure or as a diving or sinking lure.

Another important object of the invention is to provide a plug-type lure having means providing for changing the displacement of the lure without changing its weight, thus positively controlling the action of the lure by causing it to float or sink as desired.

A further object of the invention is to provide a lure having an open forward end which is arranged to cause the lure normally to dive.

Additional objects and advantages of the invention will readily be apparent from the reading of the following description of devices constructed in accordance with the invention, and reference to the accompanying drawings thereof, wherein.

Figure 4:
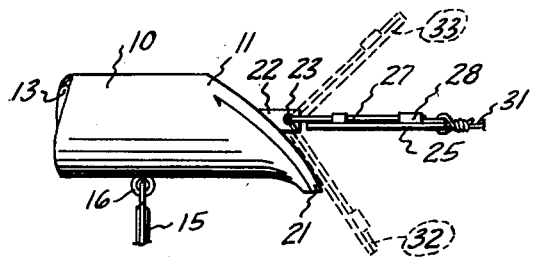
Figure 5:
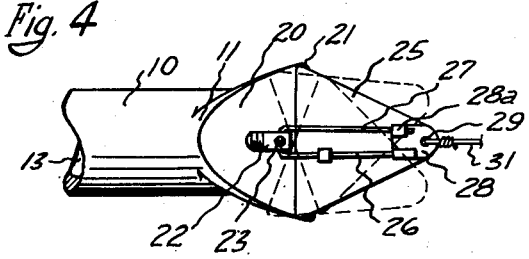
Figure 6:
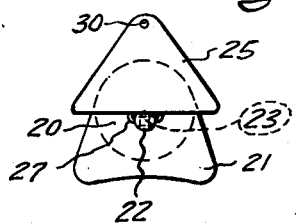
Figure 7:
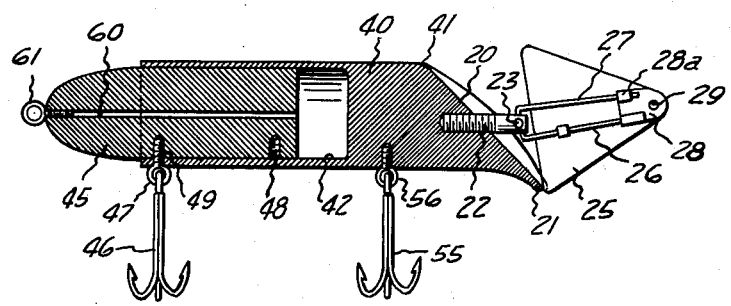
Figure 8:
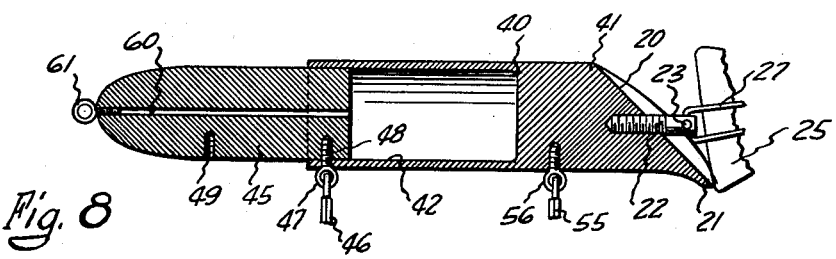
Figure 9:
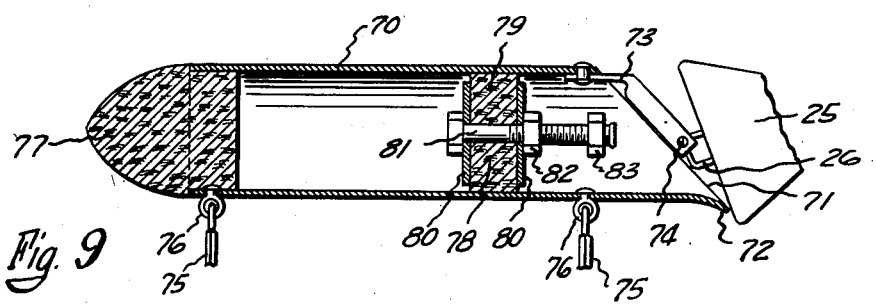
Figure 10:
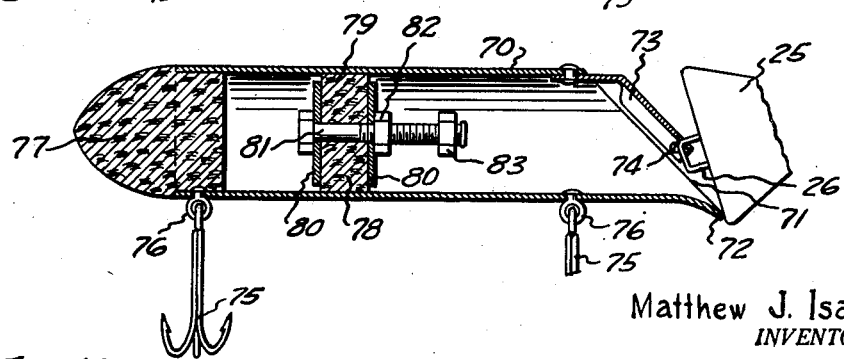

Figure 4 is a fragmentary side elevation of the lure showing the control plate in position to cause the lure to travel near the surface, Figure 5 is a fragmentary top view of the same, Figure 6 is a front end view of the device of Figure 4, Figure 7 is a longitudinal vertical sectional view of a modified form of the invention having means for controlling the displacement of the lure, and showing the parts in contracted position to cause the lure to sink, Figure 8 is a view, similar to Figure 7, illustrating the parts of the lure in extended position for increasing the displacement of the lure, whereby the same will float, Figure 9 is a longitudinal vertical sectional view of a lure having a modified form of means for controlling the displacement of the lure, and showing the same in position to cause the lure to float, and Figure 10 is a view, similar to Figure 9, showing the parts of the lure in position for decreasing the displacement of said lure, whereby the lure will sink.

In the drawings, the numeral 10 designates a lure body which is substantially cylindrical in shape and is provided with a head 11 and a semi-ellipsoidal rear end 12. While the body may be of any desired suitable structure or material, it is preferable that it may be made of a light plastic or metal with a longitudinally extending eccentric bore 13 providing a thickened wall 14 along its lower portion. A gang-type or multiple hook 15 is connected by a screw eye 16 to the thicker lower portion of the body near the head, and a similar gang-type hook 17 is connected by a screw eye 18 to the rear end of the body. Obviously, another gang-type hook (not shown) may be connected to the under side of the body between the hook 15 and the hook 17, or the hook 17 may be omitted and only a spaced pair of gang-type hooks secured to the under side of the body; or only the forward hook 15 may be used, if desired. Obviously, the weight of the thickened wall 14 and the multiple hooks causes the lure body to assume a proper position when in the water.

It will be manifest that the lure embodying the principles of this invention may be constructed of any other suitable material, such as solid wood; may be made in any of many various shapes, sizes, and styles; may be equipped with any suitable arrangements of hooks; and may be colored in any desirable manner.

The head member 11 may be formed integral with the body or may be formed as a separate part and securely connected to the body in any suitable manner, as by screw-threads, cementing or otherwise. However, the lure is preferably formed of two sections, each constituting one-half of the body and head lying on each side of a longitudinal vertical plane extending axially of the lure, as illustrated by the dotted line 19 in Figure 2. The two longitudinal halves are cemented or otherwise joined securely together to form the lure, so that the external surface of the head forms a smooth continuation of the external surface of the body, as clearly shown in Figures 1 and 2. Thus, the lure may readily be formed in the desired shape of plastic or other suitable material.

Figure 2:
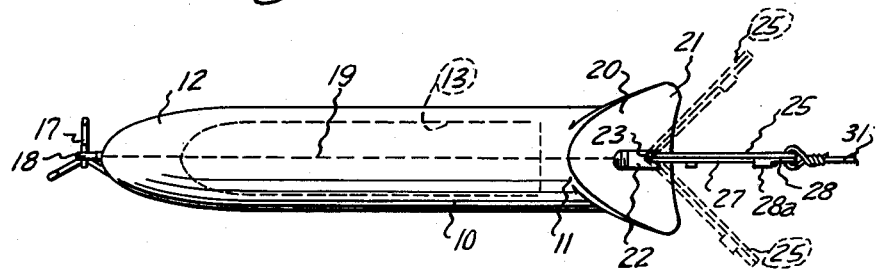
Figure 2 is a top view of the lure of Figure 1.
Figure 3:
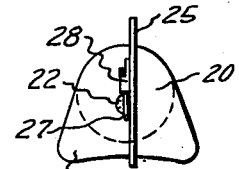
Figure 3 is a front end view of the same.

The forward end of the head is provided with a concave inclined face surface 20 which slopes downwardly and forwardly, preferably at an angle of approximately 45 degrees. An integral lip 21, forming a part of the concave face surface, projects below the lower surface of the head and also extends downwardly and outwardly to each side thereof, while the upper portion of the inclined surface merges with the cylindrical surface of the head and body, as shown in Figures 2 and 3. Thus, the inclined concave forward face surface of the head may be said to project downwardly and laterally beyond the cylindrical surface of the remainder of the plug body.

A connecting member or stud 22 is screw-threaded or otherwise secured to the forward end of the head; and, while the stud may be located at substantially any point in a vertical line centrally of the face of the head, it is preferable that the lip 21 project below the stud, and that the stud be located substantially centrally of the area of the lipped face surface. The stud is provided with a pair of transverse openings 23 near its outer end, said openings extending through the stud at right angles to each other so that one opening is vertical and one is horizontal, for a purpose which will be hereinafter explained.

A control plate 25, preferably flat and substantially triangular in configuration, has a spring snap catch 26 fixed on one side, whereby the plate may be attached to the connecting member or stud 22. The catch is of the usual construction, formed with an elongate spring arm 27 having one end secured to a catch head member 28 and having the free end of the arm bent upon itself to form a loop. The free end of the arm is adapted to engage under an inwardly turned lip 28a on the catch head member in the customary manner to close the loop. The catch head member is provided with an opening or eye 29 which is positioned at the apex of one angle of the control plate in alignment with an opening 30 formed in said control plate. A line 31, by means of which the lure may be cast and retrieved, may be connected through the opening 29 in the catch head member and the opening 30 in the control plate. The line may be connected to the catch and control plate by means of the usual swivel snap (not shown, or in any other suitable manner.

The rigid portion of the spring arm 27, which is secured to the catch head member 28, is fixed to the control plate 25 by a rivet or the like in such a manner that the loop formed by the arm extends beyond the edge of the control plate at substantially the mid-point of the side of the control plate opposite the angle having the opening 30 formed therein, and the loop is held substantially flat against the control plate.

The free end of the spring arm may be disengaged from the catch head member and inserted through one of the openings 23 in the connecting member or stud 22 and then reengaged with the inturned lip of the head member, whereby the snap catch and the control plate are detachably connected with the lure. Obviously, the control plate may swing through a wide angle with respect to the face surface of the lure, by virtue of the pivotal connection formed by the catch arm loop extending through the transverse opening 23 in the stud.

Figure 1:
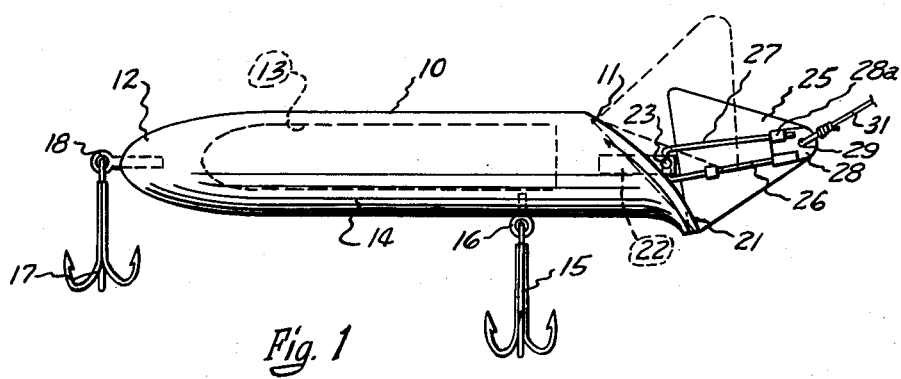
Figure 1 is a side elevation of a lure embodying principles of the invention.

The loop of the snap catch 26 may be connected in the vertical opening 23 in the stud 22 so that the control plate 25 is maintained in a vertical position, such as is illustrated in Figures 1 through 3, or the loop may be connected in the horizontal opening in said stud so that the control plate will be held in a horizontal position, such as illustrated in Figures 4 through 6.

With the control plate in the vertical position, the lure is adapted to move through the water at a deep level, since the inclined concave face surface 20 will tend to cause the lure to drive. The control plate does not offer any material resistance to the diving action of the lure, but may coact with the projecting lip 21 of the concave inclined face surface of the lure to amplify the erratic wiggling motion of the lure through the water.

When the loop of the catch 26 is connected in the horizontal opening 23 in the stud, to position the control plate 25 in a horizontal plane, the rather large flat surface of the control plate serves to cause the lure to travel at or near the surface of the water. Any tendency of the lure to dive will cause the control plate to be moved or swung upwardly at an angle above the horizontal or longitudinal position, as shown in dotted lines at 33 in Figure 4, whereby the water striking the under side of the control plate will lift the lure to the surface. Thus, the horizontal control plate counteracts the effect of the inclined concave face surface 20 and causes the lure to travel at or near the surface. The rear corners of the control plate will also tend to strike the outer edges of the concave face surface 20 as the lure turns from side to side, to increase the erratic movement of the lure.

It will therefore be seen that the control plate may be positioned in a vertical plane to permit the lure to dive or may be positioned in a horizontal plane to cause the lure to travel at or near the surface. Therefore, the lure is adapted to be used for either shallow or deep fishing, at the election of the user, merely by turning the control plate to either the vertical or horizontal position.

The triangular shape of the control plate also facilitates passage of the lure through weeds, brush and the like, since the control plate presents a small forward surface and tapers outwardly at its rear portion to substantially the same or a slightly greater dimension than the external dimension of the lure body.

If desired, the line 31 may be connected directly to the connecting member or stud 22 and the control plate may be turned to the horizontal position and permitted to drop downwardly until it engages against the lip 21 on the face 20, as shown in dotted lines at 32 in Figure 4. In such position, the control plate presents an amplified depending surface or lip which will increase to a considerable extent the erratic wiggling motion of the lure as it travels through the water. Also, with the control plate in this position the lure is caused to dive to a still greater depth as it is moved through the water.

The control plate may be connected to the stud 22 in any other suitable manner, but the use of the snap catch is preferable. The snap catch permits ready changing of the position of the control plate, and also permits use of control plates of various sizes if desired. Also, other forms of connecting members than that shown may be used, if desired, and more than one set of openings may be provided in such connecting member to permit the control plate to be connected at different points with respect to the face 20 of the lure.

From the foregoing, it will be seen that a lure has been provided which is adapted to be used for deep or shallow casting, the depth at which the lure travels being controlled by adjustment of the control plate. It will also be seen that the lip projecting downwardly and laterally from the concave inclined face surface 20 amplifies the erratic movement of the lure through the water, in conjunction with the control plate. Also, the control plate may be utilized to present an increased lip surface to further amplify the erratic motion of the lure. It is further manifest that the control plate provides for more ready passage of the lure through weeds, brush and the like.

While the form of the plug lure just described may be used for both shallow and deep casting, it may be desirable to incorporate into the lure means for positively causing the lure to sink to reach still greater depths, when fish are to be found only at such greater depths.

In such event, the construction of the lure may be modified to provide adjustable means for changing the lure from a floating lure to a sinking lure. A plug-type lure which is so constructed is illustrated in Figures 7 and 8, wherein a substantially cylindrical lure body 40, having a head 41 similar in all respects to the head of the form previously described, is provided with means for changing the displacement of the lure without changing its weight, thus positively providing for adjustably changing the lure from a floating lure to a sinking lure. Since the parts of the head of this form of the lure are the same as those of the head of the form previously described, the same reference numerals have been applied thereto without further description.

The body 40 is tubular and has an axial bore 42. The rear end of the lure body is open, and is adapted to receive a substantially cylindrical plunger 45 which has a close sliding fit in the bore of said body. The rear portion of the plunger 45 is preferably semi-ellipsoidal in configuration, to present a substantially streamlined surface which will not unduly agitate the water through which the plug travels.

A gang-type or multiple hook 46 is connected by means of a screw-eye 47 to the under side of the lure body near its rear end, and the screw-eye extends completely through the bottom wall of the body and into the plunger 45, whereby the plunger is held securely in the bore of the body. It is particularly pointed out that a pair of spaced threaded openings 48 and 49 are formed in the plunger for receiving the threaded end of the screw-eye 47, whereby the plunger may be secured in the bore of the body 40 in either an extended position such as is illustrated in Figure 8 or in a contracted position such as illustrated in Figure 7. Thus, when the plunger is secured in the body in the contracted position illustrated in Figure 7, with the screw-eye 47 threaded into the outer threaded opening 49, the over-all dimensions of the lure are reduced and the lure will not displace as great an amount of water as will be displaced when the plunger 45 is in the extended position illustrated in Figure 8 and the screw-eye is threaded into the inner opening 48.

By using suitable materials of proper dimensions and providing a suitable space in the bore of the body between the plunger 45 and the head, the weight and size of the lure may be so designed that, with the plunger in the extended position (Figure 8) sufficient water will be displaced by the lure to cause the same to float, but when the plunger is moved to the contracted position (Figure 7) the space in the bore of the body and the over-all dimensions of the lure are so reduced that the lure will sink. Therefore, the lure may be used either as a floating lure or as a sinking lure simply by adjusting the position of the plunger 45 in the bore of the body.

A gang-type or multiple hook 55 may be secured by a screw-eye 56 to the under side of the lure body at its forward end near the head 41, and the hook 46 may be omitted from the screw-eye 47, or both hook sets may be used, if desired.

To facilitate movement of the plunger in the bore of the body, a longitudinally extending opening 60 may be provided in said plunger, whereby air may enter the bore 42 of the body when the plunger is moved therein. In this manner the effect of the suction and compression of air in the bore of the body may be substantially eliminated and the plunger may readily be moved from contracted to extended position. A screw-eye plug 61 may be threaded into the outer end of the opening 60 to prevent water from entering the bore of the lure when the same is in use. If desired a multiple or gangtype hook (not shown) may be connected to the screw-eye 61.

The plug-type lure just described may be used in the same manner as the form previously described by positioning the plunger 45 in the extended position, whereby the lure is caused normally to float but may be caused to dive by the action of the inclined concave surface 20 on the head. Should it be desired to cause the lure positively to sink to a greater depth, the plunger 45 may be moved to the contracted position illustrated in Figure 7, whereupon the displacement of the lure is reduced and it will sink in the water to the desired depth.

Obviously, this feature of means incorporated in the lure for positively controlling its action so that it may be used either as a floating lure or a sinking lure, may be used independently of the improved head and control plate, and any desired type of head or lure shape may be used.

A plug-type lure, having incorporated therein slightly different means for varying the displacement of the lure, in order that the same may be caused to float or to sink at the election of the user, is illustrated in Figures 9 and 10. In this form, the lure has an elongate tubular body 70, preferably cylindrical in shape, which is open at both ends. One end of the body is cut at an angle extending downwardly and forwardly, as illustrated at 71, to cause the lure to dive, as will be hereinafter explained. The extreme lower forward end of the body wall is flared or belled outwardly and downwardly to provide a projecting lip 72 which accentuates the diving action of the lure. The lip 72 may, however, be omitted if desired.

A connecting member 73, preferably formed from flat metal, is secured by a rivet or other suitable means to the upper forward end of the lure body diametrically opposite the lip 72. The projecting portion of the connecting member is bent into substantially a U-shape in cross-section and is turned downwardly at an angle approximately the same as the angle at which the forward end of the lure body is cut. Openings 74 are formed in the extreme lower end of the connecting member, one of said openings being formed horizontally through the inturned arms of the U-shaped connecting member while the other opening is formed in the base of the U-shaped cross-section at substantially the same elevation. These openings are adapted to receive the loop of the catch 26, whereby the catch and the control plate 25 secured thereto may be connected to the lure body in either a vertical or a horizontal position. Thus, the control plate may be adjusted with relation to the lure body to cause the same to dive or to travel through the water near the surface in the same manner as has already been described. Obvious, other suitable connecting means may be used, if desired, and more than one set of openings may be provided in said connecting means.

Gang-type or multiple hook sets 75 are connected by means of eye rivets 76 to the under side of the body 70, one multiple hook set being connected near the rear end of the body while the other is connected near the forward end thereof. A closure plug 77, preferably of cork or other suitable light material, having its rear portion rounded or semi-ellipsoidal in configuration, is tightly pressed into the rear end of the lure body 70 and covers the rear eye rivet, whereby water is prevented from entering the bore of the body through the rear end or through the opening in which the eye rivet is secured.

A piston 78 is slidable in the bore of the body 70 from a position near the forward end thereof to a position near the closure plug 77. This piston is formed with a thick disc-like sealing member 79, preferably of cork or other suitable light sealing material, which is securely clamped between disc-like plates 80 mounted on each side of the sealing member and held securely thereagainst by an axially extending screw 81 upon which a nut 82 is threaded to press the plates together to support the packing or sealing element 79. The screw 81 is somewhat longer than the thickness of the piston 78 and a second nut 83 is threaded onto the outer end of the screw. The end of the screw is peened to maintain the second nut thereon to provide means for engagement with suitable hook-like actuating means (not shown), whereby the piston may be pushed or pulled longitudinally in the bore of the body 70.

Obviously, the piston 78 may be pressed inwardly in the bore of the body toward the closure plug 77 to reduce the size of the chamber between the piston and the plug in which air is trapped. In such event, water will enter the open forward end of the body but will be precluded from entering the space between the piston and the closure plug. Thus, the lure may be caused to sink if the piston is moved sufficiently close to the closure plug to so reduce the volume of the space between the piston and the plug that the displacement and buoyancy of the lure is not adequate to cause the same to float. Manifestly, by moving the piston toward the forward end of the bore of the lure body as shown in Figure 9, the size of the chamber between the piston 78 and the plug 77 will be increased, whereby water will be prevented from entering the space between said piston and plug and the buoyancy and displacement of the lure will be adequate to cause the same to float.

An inclined face surface is not absolutely required to cause the lure to dive, since the provision of the inclined forward end wall 71 on the body permits the water entering the open forward end of the lure body to escape more readily at the upper end thereof but not to escape as readily at the lower end, thus positively causing the lure to move downwardly as it is pulled forwardly through the water. The diving and wiggling motion attributable to the lure of the previous form will, therefore, be obtained in this form of the lure. This diving action will be further amplified by the provision of the lip 72.

The control plate 25 will function, in the manner already described, to cause the lure to travel at shallow or deep depths in accordance with the angle at which the control plate is positioned with respect to the forward end of the body. If the control plate is in a vertical position the lure may dive without material interference by said control plate. If the control plate is in the horizontal position, the diving action which the angular forward end of the lure body ordinarily causes is overcome by the resistance of the control plate thereto, and the lure will travel near the surface.

It will also be manifest that the fishing line may be connected directly to the connecting member 73 if desired, and the control plate may be omitted. In such event, the lure will function in the same manner as the ordinary floating plug-type lure or as the ordinary sinking plug-type lure, such floating or sinking action being obtained by adjusting the displacement of the plug-type lure to cause the same to float or sink.

From the foregoing, it will be seen that a lure has been provided which is so constructed that it may be adjusted to be used as a floating lure or as a diving or sinking lure; such results being obtained by providing means for changing the displacement of the lure without changing its weight. Further, such means has been incorporated in the lure in combination with an improved head and control plate, whereby the action of the plug-type lure may be positively changed to meet a wide variety of fishing conditions, ranging from skittering top of the water action to extremely deep action.

The foregoing description of the invention is explanatory only, and changes in the details of the constructions illustrated may be made by those skilled in the art, within the scope of the appended claims, without departing from the spirit of the invention.

What I claim and desire to secure by Letters Patent is:

1. A fishing plug lure including, a body having a longitudinally extending substantially cylindrical cavity formed therein, a closure member carried by the body and slidable longitudinally in the cavity in the said body for altering the displacement of the body, said body having no lateral openings through which air confined in said cavity by said closure member may escape from said cavity, means to which a hook may be secured constituting limiting means for limiting the movement of the slidable closure relative to the body, and a connecting member carried by the forward end of the body independently of the slidable member for connecting the body to a line.

2. A casting plug lure including, an elongate body having a longitudinal axis, means secured to said body for selectively changing the displacement and buoyancy of the lure without changing the weight thereof, a substantially flat control plate, a connecting member carried by the body and projecting forwardly therefrom and having horizontal and vertical transverse openings disposed at right angles to each other formed therein and intersecting in substantial alignment with the longitudinal axis of the body, and connecting means carried by the control plate selectively engageable in either of the transverse openings for pivotally connecting said control plate to said body at its forward end in either horizontal or vertical relationship with respect to the body, said control plate being pivotally movable about a horizontal axis extending substantially perpendicular to said longitudinal axis when connected in horizontal relationship with respect to the body and being pivotally movable about a vertical axis extending substantially perpendicular to said longitudinal axis when connected in vertical relationship with respect to said body.

3. A fishing plug lure including, a body part having a longitudinally extending substantially cylindrical cavity formed therein, a closure member part carried by the body part and slidable longitudinally in the cavity in the body part for altering the displacement of the body part, cooperating means on one of the parts to constitute limiting means for limiting the movement of the slidable closure member part relative to the body part, and also to facilitate securing a hook to the lure body part, and a connecting member carried by the forward end of the body part independent of the slidable closure member part for connecting the body part to a line.

4. A lure including a substantially cylindrical body having a longitudinal axis, a connecting member carried by the body and projecting forwardly therefrom and having transverse openings disposed at right angles to each other horizontally and vertically formed therein in substantial alignment with a plane of the longitudinal axis of the body, a control plate, and connecting means carried by the control plate selectively engageable in either of the transverse openings of the connecting member, whereby the control plate is pivotally movable about a horizontal axis extending substantially perpendicular to said longitudinal axis when connected in the horizontal opening and being pivotally movable about a vertical axis extending substantially perpendicular to said longitudinal axis when connected in the vertical opening, said connecting means comprising a U-shaped snap, one of the arms of which is rigid with a face of the plate and the other arm thereof being detachably connected to said face of said plate, the bight of the U being adapted to be received in the openings.

5. A lure of the character set forth in claim 4 wherein the body consists of one member provided with a longitudinally extending substantially cylindrical cavity, and a closure member carried by said one member and slidable longitudinally in the cavity for altering the displacement of the body without altering the weight of said body.

MATTHEW J. ISAAC.

REFERENCES CITED

The following references are of record in the file of this patent:

UNITED STATES PATENTS

| Number | Name | Date |
|---|---|---|
| 1,394,313 | Leeper | Oct. 18, 1921 |
| 1,418,229 | Buddle | May 30, 1922 |
| 1,483,842 | Carter | Feb. 12, 1924 |
| 1,542,404 | Paulson | June 16, 1925 |
| 1,600,653 | Steenstrup | Sept. 21, 1926 |
| 1,707,820 | Stackelberg | Apr. 2, 1929 |
| 1,854,696 | Herington | Apr. 19, 1932 |
| 1,898,740 | Novitzky | Feb. 21, 1933 |
| 1,994,678 | Yarvise | Mar. 19, 1935 |
| 2,055,841 | Haislip | Sept. 29, 1936 |
| 2,123,951 | McArthur | July 19, 1938 |
| 2,127,667 | Pflueger | Aug. 23, 1938 |
| 2,149,054 | Jones | Feb. 28, 1939 |
| 2,152,275 | Parkins | Mar. 28, 1939 |
| 2,159,606 | Scogland | May 23, 1939 |
| 2,249,770 | McArthur | July 22, 1941 |

FOREIGN PATENTS

| Number | Country | Date |
|---|---|---|
| 14,224 | Great Britain | of 1897 |
| 20,443 | Great Britain | of 1891 |
| 21,622 | Great Britain | 1891 |